US012232106B2

(12) United States Patent
Li et al.

(10) Patent No.: US 12,232,106 B2
(45) Date of Patent: Feb. 18, 2025

(54) RESOURCE DETERMINING METHOD, RESOURCE CONFIGURATION METHOD, TERMINAL, AND NETWORK DEVICE

(71) Applicant: VIVO MOBILE COMMUNICATION CO., LTD., Guangdong (CN)

(72) Inventors: Na Li, Guangdong (CN); Xueming Pan, Guangdong (CN); Xiaodong Shen, Guangdong (CN)

(73) Assignee: VIVO COMMUNICATION CO., LTD., Guangdong (CN)

( * ) Notice: Subject to any disclaimer, the term of this patent is extended or adjusted under 35 U.S.C. 154(b) by 349 days.

(21) Appl. No.: 17/733,573

(22) Filed: Apr. 29, 2022

(65) Prior Publication Data

US 2022/0264606 A1  Aug. 18, 2022

Related U.S. Application Data

(63) Continuation of application No. PCT/CN2020/128096, filed on Nov. 11, 2020.

(30) Foreign Application Priority Data

Nov. 14, 2019  (CN) .......................... 201911114661.6

(51) Int. Cl.
*H04W 72/1268* (2023.01)
*H04L 1/1812* (2023.01)
(Continued)

(52) U.S. Cl.
CPC ....... *H04W 72/1268* (2013.01); *H04L 1/1812* (2013.01); *H04L 5/0053* (2013.01); *H04W 72/0446* (2013.01); *H04W 72/542* (2023.01)

(58) Field of Classification Search
CPC .............. H04L 1/1812; H04L 5/0053; H04W 72/0446; H04W 72/1268; H04W 72/542
See application file for complete search history.

(56) References Cited

U.S. PATENT DOCUMENTS

2018/0279327 A1  9/2018 Ying et al.
2018/0368173 A1* 12/2018 Shaheen ............... H04W 72/23
(Continued)

FOREIGN PATENT DOCUMENTS

CN  109660324 A  4/2019
CN  109788574 A  5/2019
(Continued)

OTHER PUBLICATIONS

First Office Action for Chinese Application No. 201911114661.6, dated Mar. 1, 2022, 10 Pages.
(Continued)

*Primary Examiner* — Brian P Cox
(74) *Attorney, Agent, or Firm* — BROOKS KUSHMAN P.C.

(57) ABSTRACT

A resource determining method, a resource configuration method, a terminal, and a network device are provided. The resource determining method includes: determining a sub-slot in which first information is located; and determining, based on starting symbol information and the number of symbols of a PUCCH resource corresponding to the first information, a resource location of the PUCCH resource in the sub-slot.

19 Claims, 6 Drawing Sheets

Determine a sub-slot in which first information is located  101

Determine, based on starting symbol information and the number of symbols of a PUCCH resource corresponding to the first information, a resource location of the PUCCH resource in the sub-slot  102

(51) Int. Cl.
*H04L 5/00* (2006.01)
*H04W 72/0446* (2023.01)
*H04W 72/542* (2023.01)

(56) References Cited

U.S. PATENT DOCUMENTS

| | | | |
|---|---|---|---|
| 2019/0246416 A1* | 8/2019 | Park | .................. H04L 1/1812 |
| 2019/0349973 A1 | 11/2019 | Yang et al. | |
| 2019/0357156 A1 | 11/2019 | Lee et al. | |
| 2020/0259629 A1* | 8/2020 | Ovesjö | ................ H04L 5/0082 |
| 2020/0274670 A1 | 8/2020 | Sun et al. | |
| 2020/0275431 A1 | 8/2020 | Bae et al. | |
| 2021/0368496 A1* | 11/2021 | Li | .................... H04W 72/0446 |
| 2021/0368545 A1 | 11/2021 | Xu et al. | |

FOREIGN PATENT DOCUMENTS

| | | | |
|---|---|---|---|
| CN | 110138529 A | 8/2019 | |
| CN | 110419186 A | 11/2019 | |
| WO | 2018203694 A1 | 11/2018 | |
| WO | WO-2018229731 A1 * | 12/2018 | ............ H04L 5/001 |
| WO | 2019093841 A1 | 5/2019 | |

OTHER PUBLICATIONS

International Search Report and Written Opinion for Application No. PCT/CN2020/128096, dated Feb. 10, 2021, 9 Pages.
First Office Action for Indian Application No. 202227024763, dated Sep. 7, 2022, 6 Pages (including English Translation).
Spreadtrum Communications, "Remaining Details on Short-PUCCH," 3GPP TSG RAN WG1 #93, Agenda item 7.3.2.1.1, May 21-25, 2018, R1-1806400, Busan, Korea, 5 Pages.
OPPO, "UCI Enhancement for URLLC," 3GPP TSG RAN WG1 #95, Agenda item 7.2.6.1.2, Nov. 12-16, 2018, R1-1812816, Spokane, WA, USA, 9 Pages.
LG Electronics, "UCI Enhancements for NR URLLC," 3GPP TSG RAN WG1 #96bis, Agenda item 7.2.6.2, Apr. 8-12, 2019, R1-1904628, Xi'an, China, 6 Pages.
CATT, "UL Control Enhancements for URLLC," 3GPP TSG RAN WG1 #96bis, Agenda item 7.2.6.2, Apr. 8-12, 2019, R1-1905360, Xi'an, China, 6 Pages.
Ericsson, "UCI Enhancements for NR URLLC," 3GPP TSG RAN WG1 #97, Agenda item 7.2.6.2, May 13-17, 2019, R1-1906092, Reno, NV, USA, 10 Pages.
Samsung, "UL Control for URLLC," 3GPP TSG RAN WG1 #97, Agenda item 7.2.6.2, May 13-17, 2019, R1-1906956, Reno, NV, USA, 10 Pages.
First Office Action for Japanese Application No. 2022-527866, dated Apr. 5, 2023, 3 Pages.
Vivo, "UCI enhancements for URLLC" 3GPP TSG RAN WG1 #96bis, Xi'an, China, Apr. 2019, R1-1904082, 11 Pages.
Spreadtrum Communications, "Discussion on UCI enhancements for URLLC" 3GPP TSG RAN WG1 #99, Reno, USA, Nov. 2019, R1-1912566, 8 Pages.
Samsung, "Introduction of Ultra Reliable Low Latency Communications Enhancements" 3GPP TSG-RAN WG1 Meeting #99, Reno, USA, Nov. 2019, R1-1913197, 41 Pages.
Extended European Search Report for Application No. 20886851.3-1215, dated Nov. 15, 2022, 12 Pages.
Samsung, "Enhancements on Multi-TRP/Panel Transmission," 3GPP TSG RAN WG1 #99, Agenda item 7.2.8.2, Nov. 18-22, 2019, R1-1912482, Reno, Nevada, USA, 13 Pages.
First Office Action for Korean Application No. 10-2022-7016701, dated Mar. 14, 2024, 7 Pages.
Qualcomm Incorporated "Aspects related to UL control channels" 3GPP TSG RAN WG1 #92, Athens, Greece, Feb. 2018, R1-1802310, 9 Pages.
NTT Docomo, Inc. "UCI enhancements for URLLC" 3GPP TSG RAN WG1 #97, Reno, USA, May 2019, R1-1906212, 9 Pages.
Panasonic "Discussion on UCI enhancement for URLLC" 3GPP TSG RAN WG1 #99, Reno, USA, Nov. 2019, R1-1912748, 8 Pages.
First Office Action for Singapore Application No. 11202204482S, dated Mar. 15, 2024, 13 Pages.

* cited by examiner

RESOURCE DETERMINING METHOD, RESOURCE CONFIGURATION METHOD, TERMINAL, AND NETWORK DEVICE

CROSS-REFERENCE TO RELATED APPLICATIONS

This application is a continuation of PCT Application No. PCT/CN2020/128096 filed on Nov. 11, 2020, which claims priority to Chinese Patent Application No. 201911114661.6, filed on Nov. 14, 2019, disclosures of which are incorporated herein by reference in their entireties.

TECHNICAL FIELD

This disclosure relates to the field of communications technologies, and in particular, to a resource determining method, a resource configuration method, a terminal, and a network device.

BACKGROUND

In conventional technology, when transmitting information such as channel state information (CSI), terminals such as user equipment (UE) may determine, based on a periodicity and an offset of the CSI, a slot for transmitting the CSI, and determine, based on a starting symbol of a physical uplink control channel (PUCCH) resource, a transmission location in the slot, where the PUCCH resource is configured based on slots. However, if the UE is configured with a sub-slot-based PUCCH resource, how the UE transmission location is determined is a problem to be urgently resolved.

SUMMARY

According to a first aspect, an embodiment of this disclosure provides a resource determining method, applied to a terminal and including:
  determining a sub-slot in which first information is located; and
  determining, based on starting symbol information and the number of symbols of a PUCCH resource corresponding to the first information, a resource location of the PUCCH resource in the sub-slot.

According to a second aspect, an embodiment of this disclosure provides a resource configuration method, applied to a network device and including:
  transmitting sub-slot configuration information of first information to a terminal, where
  the sub-slot configuration information indicates an offset of a sub-slot in which the first information is located in a slot in which the first information is located; or
  in a case that a periodicity of the first information is longer than a symbol length of the sub-slot in which the first information is located and shorter than one slot, the sub-slot configuration information indicates an offset of the sub-slot in which the first information is located in the periodicity of the first information.

According to a third aspect, an embodiment of this disclosure provides a terminal, including:
  a first determining module, configured to determine a sub-slot in which first information is located; and
  a second determining module, configured to determine, based on starting symbol information and the number of symbols of a PUCCH resource corresponding to the first information, a resource location of the PUCCH resource in the sub-slot.

According to a fourth aspect, an embodiment of this disclosure provides a network device, including:
  a transmitting module, configured to transmit sub-slot configuration information of first information to a terminal, where
  the sub-slot configuration information indicates an offset of a sub-slot in which the first information is located in a slot in which the first information is located; or
  in a case that a periodicity of the first information is longer than a symbol length of the sub-slot in which the first information is located and shorter than one slot, the sub-slot configuration information indicates an offset of the sub-slot in which the first information is located in the periodicity of the first information.

According to a fifth aspect, an embodiment of this disclosure provides a communications device, including a memory, a processor, and a computer program stored in the memory and capable of running on the processor, where when the computer program is executed by the processor, the steps of the resource determining method are implemented, or the steps of the foregoing resource configuration method are implemented.

According to a sixth aspect, an embodiment of this disclosure provides a computer-readable storage medium storing a computer program. When the computer program is executed by a processor, the steps of the resource determining method are implemented, or the steps of the foregoing resource configuration method are implemented.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following descriptions show only some embodiments of this disclosure, and a person of ordinary skill in the art may still derive other drawings from these accompanying drawings without creative efforts.

DETAILED DESCRIPTION

Figure 1:
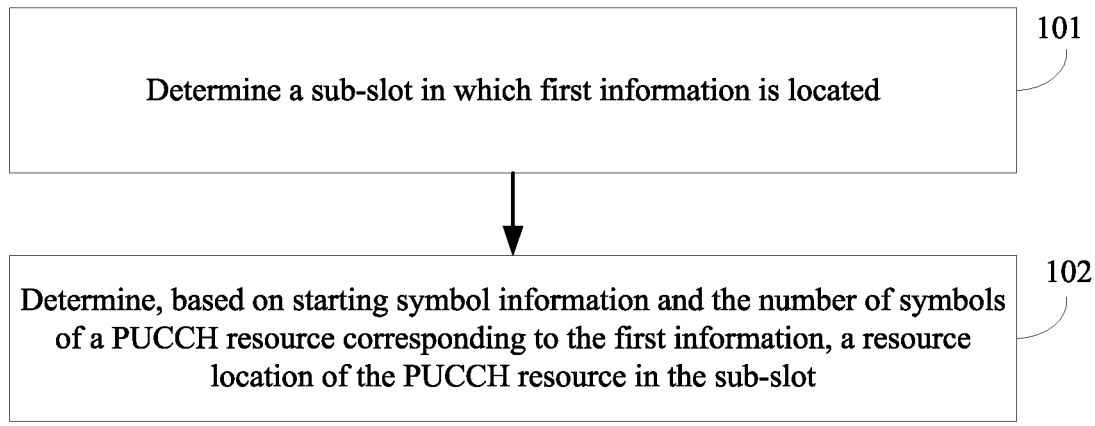
FIG. 1 is a flowchart of a resource determining method according to an embodiment of this disclosure.

To describe the technical solutions in the embodiments of this disclosure more clearly, the following briefly describes the accompanying drawings required for describing the embodiments of this disclosure. Apparently, the accompanying drawings in the following descriptions show only some embodiments of this disclosure, and a person of ordinary skill in the art may still derive other drawings from these accompanying drawings without creative efforts.

A wireless communication system in the embodiments of this disclosure includes a terminal and a network device. The terminal may also be referred to as a terminal device or user equipment (UE). The terminal may be a terminal side device such as a mobile phone, a tablet computer (Tablet Personal Computer), a laptop computer, a personal digital assistant (PDA), a mobile Internet device (MID), a wearable device, or an in-vehicle device. It should be noted that the specific type of the terminal is not limited in the embodiments of this disclosure. The network device may be a base station or a core network. The base station may be a $5^{th}$ Generation (5G) base station or a base station of a later release (for example, a next generation node base station (gNB), and a 5G new ratio (NR) node base station (NB)), or base stations in other communications systems (for example, an evolved base station (evolved node base station, eNB), a wireless local area network (WLAN) access point, or other access points). The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a wireless fidelity (WiFi) node, or other appropriate terms in the art. As long as a same technical effect is achieved, the base station is not limited to a specific technical term.

In the embodiments of this disclosure, 1 frame equals 10 ms, 1 frame equals 10 subframes, and 1 subframe equals $2^\mu$ slots, where $\mu$ denotes a subcarrier spacing. Each slot may contain 14 orthogonal frequency division multiplexing (OFDM) symbols (normal cyclic prefix (CP)), or contain 12 OFDM symbols (extended CP).

As for PUCCH resource configuration and transmission, a PUCCH symbol length is configurable. Different PUCCH formats support different OFDM symbol lengths. Format 0 and format 2 of PUCCH are short formats, whose corresponding number of symbols may be 1 or 2. Format 1, format 3, and format 4 of PUCCH are long formats, whose corresponding number of symbols may be 4 to 14. However, all PUCCH resources are usually configured in one slot, and PUCCH resources in time domain are configured by starting symbol and the number of symbols, where a starting symbol index is an offset in a number of symbols with respect to a starting location, that is, the first OFDM symbol, of the slot. The UE may determine a time domain resource location of the PUCCH based on the starting symbol and the number of symbols of the PUCCH.

In the embodiments of this disclosure, one slot may be divided into a plurality of sub-slots. The PUCCH can be transmitted in each of the sub-slots. In an embodiment, the number of symbols contained in each sub-slot may be configured by RRC, for example, configured by a parameter SubslotLength-ForPUCCH. For example, each sub-slot may contain 2 or 7 symbols.

The embodiments of this disclosure are described in detail below with reference to the accompanying drawings.

Referring to FIG. 1, FIG. 1 is a flowchart of a resource determining method according to an embodiment of this disclosure. The method is applied to a terminal, and as shown in FIG. 1, the method includes the following steps:

Step 101: Determine a sub-slot in which first information is located.

In this embodiment, the sub-slot in which first information is located may be expressed as a sub-slot in which a transmission resource of the first information is located, or a sub-slot for transmitting the first information.

Optionally, the first information may be a scheduling request (SR) or CSI. The SR is a type of uplink control information (UCI), mainly used for the terminal to request an uplink data transmission resource from a base station in a case that the terminal needs to transmit uplink data but no uplink data transmission resource is available. An SR transmission resource is configured by radio resource control (RRC), and is periodical. For example, a periodicity of the SR may be 2 or 7 symbols (such as OFDM symbols), that is, shorter than 1 slot; or may be 1 or n (n is an integer greater than 1) slots. In a case that the periodicity of the SR is longer than 1 slot, when being configured by RRC, a slot offset in the periodicity of the SR may be configured by offsetting. However, a periodicity of the CSI is n slots, for example, with a minimum being 4 slots. When the CSI is being configured, a slot offset of the CSI in a period is configured. The base station configures one PUCCH resource for each SR or CSI.

Step 102: Determine, based on starting symbol information and the number of symbols of a PUCCH resource corresponding to the first information, a resource location of the PUCCH resource in the sub-slot.

It should be noted that in this embodiment, the terminal is configured with a sub-slot-based PUCCH resource, which means that the PUCCH resource is configured based on sub-slots. As for the CSI, the CSI is transmitted in each period. To be specific, the CSI is transmitted after a location of the PUCCH resource is determined (except for special cases, for example, when the CSI is dropped during UCI multiplexing or during handling of a collision with another channel). However, as for SR, only a SR transmission occasion in a PUCCH (a SR transmission occasion in a PUCCH) is determined. If the terminal needs to transmit SR, only a positive SR is transmitted in a PUCCH, and a negative SR is not transmitted in the PUCCH.

Optionally, a starting symbol (for example, an OFDM symbol) of the PUCCH resource may be defined with respect to the first symbol of a corresponding slot, or may be defined with respect to the first symbol of a corresponding sub-slot. The starting symbol information may be a starting symbol index (startingSymbolIndex), a starting symbol location, or the like.

In an implementation, the starting symbol index of the PUCCH resource may be an offset, in a number of symbols, of a starting symbol (for example, an OFDM symbol) of the PUCCH resource with respect to the first symbol (for example, an OFDM symbol) of a slot in which the PUCCH resource is located.

In another implementation, the starting symbol index of the PUCCH resource may be an offset, in a number of symbols, of a starting symbol (for example, an OFDM symbol) of the PUCCH resource with respect to the first symbol (for example, an OFDM symbol) of a sub-slot in which the PUCCH resource is located. It may be understood that the starting symbol index herein is less than a symbol length of the sub-slot.

In the resource determining method in this embodiment of this disclosure, the sub-slot in which the first information such as SR or CSI is located can be determined, and based on the starting symbol information and the number of symbols of the corresponding PUCCH resource, the resource location of a PUCCH resource in the sub-slot can be determined. Therefore, when the terminal is configured with a sub-slot-based PUCCH resource, a transmission location can be determined, improving effectiveness of a communications system.

In this embodiment of this disclosure, before determining the sub-slot in which the first information is located, the terminal may receive configuration information of the first information from a network device so as to determine the sub-slot based on the configuration information. In a specific implementation, as for the first information, its slot may be determined before its sub-slot is determined, or its slot may be determined after its sub-slot is determined.

Optionally, when the first information is CSI, or the first information is a SR and a periodicity (that is, a transmission periodicity) of the SR is longer than one slot, the process of determining a sub-slot in step 101 may include: determining, based on configuration information of the first information, a slot in which the first information is located, where the configuration information indicates a periodicity and an offset of the first information, the periodicity measured in slots and the offset measured in slots; and determining the sub-slot in which the first information is located based on any one of the following:

(1) a pre-defined relationship between the sub-slot and the slot.

Optionally, the pre-definition in (1) may be a definition by a protocol.

In an implementation, the pre-defined relationship in (1) may include any one of the following:
the sub-slot is the first sub-slot of the slot; and
the sub-slot is the last sub-slot of the slot.

In this way, based on the pre-definition, the first sub-slot or the last sub-slot may be defined, which can help the terminal determine the sub-slot desired, thereby improving transmission performance.

It can be understood that in addition to the above-mentioned cases, the pre-defined relationship in (1) may alternatively have other cases, for example, it is pre-defined that the sub-slot is one with the longest symbol length of the slots. This is not limited in this embodiment.

(2) the starting symbol information of the PUCCH resource.

Optionally, the starting symbol information in (2) may be a starting symbol index.

In an implementation, the starting symbol index may be an offset in a number of symbols with respect to the first symbol of a corresponding slot. As such, based on the starting symbol index and the number of symbols contained in the sub-slot, a sub-slot in which corresponding information is located can be determined. For example, if one slot contains 14 symbols, the slot is divided into two sub-slots each containing 7 symbols, and a starting symbol index of a PUCCH resource corresponding to the CSI is 2. Then the sub-slot in which the CSI is located is the first sub-slot.

In an implementation, the starting symbol index may be an offset in a number of symbols with respect to the first symbol of a corresponding sub-slot. In this case, the corresponding sub-slot may be determined based on a preset rule according to, for example, a value obtained by using a remainder finding formula $l_0$ mod N, where $l_0$ denotes the starting symbol index of the PUCCH resource, N denotes the number of sub-slots included in one slot, and mod denotes a remainder finding sign. The preset rule is, for example, a correspondence between values obtained by remainder finding and sub-slots, for example, 0 corresponds to the first sub-slot, and 1 corresponds to the second sub-slot.

(3) a preconfigured offset of the sub-slot in the slot.

Optionally, the offset in (3) may be measured in sub-slots, or may be measured in symbols. The offset may be used for indicating an ordinal position of the sub-slot in the corresponding slot, that is, a sub-slot offset with respect to the first sub-slot of the slot; or, may be used for indicating a symbol offset of a starting symbol of the sub-slot with respect to a starting symbol of the corresponding slot.

In an implementation, the terminal may receive sub-slot configuration information of the first information from the network device, where the sub-slot configuration information indicates an offset of the sub-slot in which the first information is located in the slot in which the first information is located.

Further, the sub-slot configuration information may be transmitted by using a new RRC parameter. For example, as for CSI configuration, the new RRC parameter may be CSI-ReportSub-slotOffset INTERGER(0 . . . N−1), where N denotes the number of sub-slots in one slot.

It should be noted that in a case that the first information is CSI, or the first information is a SR and a periodicity (that is, a transmission periodicity) of the SR is longer than one slot, and the starting symbol index of the corresponding PUCCH resource is defined with respect to the first symbol of the slot in which the PUCCH resource is located, if the first information further includes hybrid automatic repeat request acknowledgement (HARQ-ACK) feedback information, a starting symbol of the PUCCH resource corresponding to the HARQ-ACK feedback information is defined with respect to the first symbol of a sub-slot in which the PUCCH resource is located. To be specific, the starting symbol index of the PUCCH resource may be an offset, in a number of symbols, of the starting symbol of the PUCCH resource with respect to the first symbol of the sub-slot in which the PUCCH resource is located.

Optionally, in a case that the first information is a SR and a periodicity of the SR is one slot, a process of determining the sub-slot in the Step 101 may include:
determining a sub-slot in which the SR is located in each slot based on any one of the following:
(1) a pre-defined relationship between the sub-slot and each slot.

Optionally, the pre-definition in (1) may be a definition by a protocol.

In an implementation, the pre-defined relationship in (1) may include any one of the following:
the sub-slot is the first sub-slot of each slot; and
the sub-slot is the last sub-slot of each slot.

Such pre-definition which defines the sub-slot as the first sub-slot or the last sub-slot helps the terminal determine the sub-slot desired, thereby improving transmission performance.

It can be understood that in addition to the above-mentioned cases, the pre-defined relationship in (1) may alternatively have other cases, for example, it is pre-defined that the sub-slot is one with the longest symbol length of the slots. This is not limited in this embodiment.

(2) the starting symbol information of the PUCCH resource.

Optionally, the starting symbol information in (2) may be a starting symbol index.

In an implementation, the starting symbol index may be an offset in a number of symbols with respect to the first symbol of a corresponding slot or sub-slot. For a manner of determining the sub-slot, reference may be made to the foregoing description.

(3) a preconfigured offset of the sub-slot in each slot.

Optionally, the offset in (3) may be measured in sub-slots, or may be measured in symbols. The offset may be used for indicating an ordinal position of the sub-slot in each slot, that is, a sub-slot offset with respect to the first sub-slot of the slot; or, may be used for indicating a symbol offset of a starting symbol of the sub-slot with respect to a starting symbol of the corresponding slot.

In an implementation, the terminal may receive sub-slot configuration information of the first information from the network device, where the sub-slot configuration information indicates an offset of the sub-slot in which the first information is located in each slot.

Further, the sub-slot configuration information may be transmitted by using a new RRC parameter. For example, as for SR configuration, the new RRC parameter may be SR-ReportSub-slotOffset INTERGER(0 . . . N−1), where N denotes the number of sub-slots in one slot.

Optionally, in a case that the first information is an SR and a periodicity of the SR is shorter than one slot (for example, 2 symbols or 7 symbols), the process of determining a sub-slot in step 101 may include:

determining a sub-slot in which the SR is located in each slot based on any one of the following:

(1) the starting symbol information of the PUCCH resource.

Optionally, the starting symbol information in (1) may be a starting symbol index.

In an implementation, the starting symbol index may be an offset in a number of symbols with respect to the first symbol of a corresponding slot. In this case, the sub-slot in which the SR is located may be determined by performing the following process: first, a formula $(l_0 \bmod N) \bmod SR_{PERIODICITY}=0$ is applied to determine a PUCCH transmission occasion resource in one slot, where the PUCCH transmission occasion resource may be provided in plurality, $l_0$ denotes the starting symbol index (for example, a starting symbol index of a PUCCH corresponding to a SR configured by RRC), l denotes a starting symbol index of a SR PUCCH transmission occasion resource (an offset in a number of symbols with respect to the first symbol of the slot), for example, its values being 0, 1, . . . , 13, and $SR_{PERIODICITY}$ denotes the number of symbols in the periodicity of the SR; as for a value (for example, 2) of the starting symbol location l that satisfies the foregoing formula, a SR PUCCH transmission occasion resource location can be determined based on the starting symbol location l and the number of symbols of the PUCCH; then the sub-slot in which the SR is located is determined based on the SR PUCCH transmission occasion resource location and the sub-slot configuration. It should be noted that if one determined SR PUCCH transmission occasion resource is across a sub-slot boundary, with a starting symbol of the PUCCH in one sub-slot and an end symbol thereof in another sub-slot, then that PUCCH transmission occasion resource is unusable; or, when the PUCCH transmission occasion resource overlaps another channel (for example, HARQ-ACK PUCCH), the PUCCH transmission occasion resource may not cross a sub-slot boundary (a resource across a sub-slot boundary is unusable), and otherwise, the PUCCH transmission occasion resource may cross a sub-slot boundary (a resource across a sub-slot boundary is usable).

In another implementation, the starting symbol index may be an offset in a number of symbols with respect to the first symbol of a corresponding sub-slot. In this case, if the periodicity of the SR is shorter than or equal to a symbol length of the sub-slot in which the SR is located, then there is a SR PUCCH transmission occasion in each sub-slot. The formula $(l_0 \bmod N) \bmod SR_{PERIODICITY}=0$ may be used to determine a PUCCH transmission occasion resource in one sub-slot, where the PUCCH transmission occasion resource may be provided in plurality, $l_0$ denotes the starting symbol index (for example, a starting symbol index of a PUCCH corresponding to a SR configured by RRC), l denotes a starting symbol index of a SR PUCCH transmission occasion resource (an offset, in a number of symbols, with respect to the first symbol of the sub-slot), for example, its values being symbol locations in the sub-slot, such as 0, 1, . . . (length of sub-slot−1), and $SR_{PERIODICITY}$ denotes the number of symbols in the periodicity of the SR; as for a value (for example, 2) of the starting symbol location l that satisfies the foregoing formula, a SR PUCCH transmission occasion resource can be determined based on the starting symbol location l and the number of symbols of the PUCCH.

(2) in a case that the periodicity of the SR (for example, 7 symbols) is longer than the symbol length of the sub-slot (for example, 2 symbols), a preconfigured offset of the sub-slot in the periodicity of the SR.

Optionally, the offset in (2) may be measured in sub-slots, or may be measured in symbols. The offset may be used for indicating an ordinal position of the sub-slot in a corresponding periodicity of the SR, that is, a sub-slot offset with respect to the first sub-slot of the periodicity of the SR; or, may be used for indicating a symbol offset of a starting symbol of the sub-slot with respect to a starting symbol of the corresponding periodicity of the SR.

In an implementation, the terminal may receive sub-slot configuration information of the first information from the network device, where the sub-slot configuration information indicates an offset of the sub-slot in which the SR is located in the periodicity of the SR when the periodicity of the SR is longer than the symbol length of the sub-slot in which the SR is located and shorter than one slot. In this case, the sub-slot in which the SR is located may be determined based on the offset and the periodicity of the SR.

With reference to specific examples and accompanying drawings, the following describes the resource determining procedure in this disclosure.

Example 1

Example 1 takes CSI as an example, where a periodicity and offset configuration of the CSI (CSI-ReportPeriodicityAndOffset) is {slots 4, and INTEGER(0 . . . 3)=1}, indicating that the CSI has a periodicity of 4 slots and an offset of 1 slot.

Figure 2A:
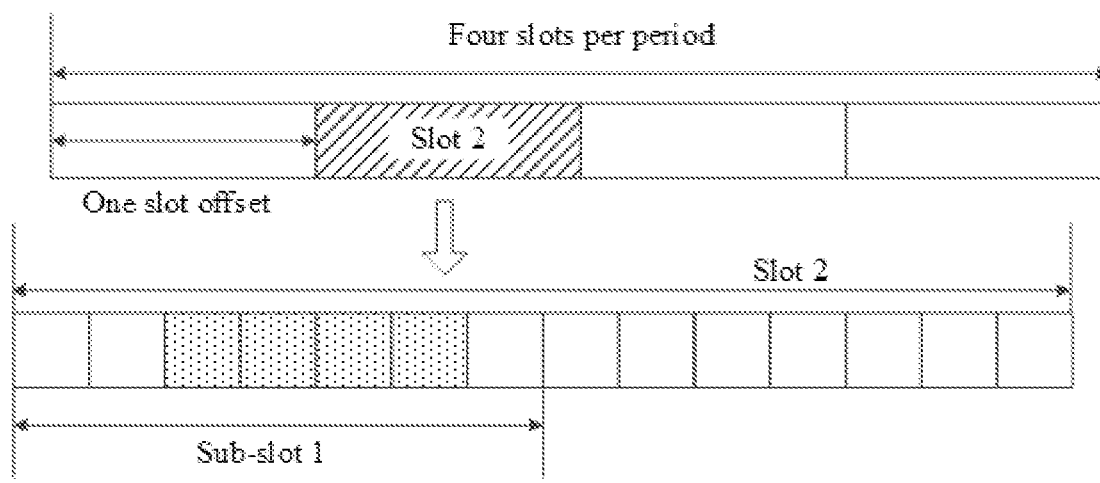
FIG. 2A is a first schematic diagram of a slot of a transmission location in example 1 of this disclosure.

If in a PUCCH configuration (PUCCH-Config) corresponding to a PUCCH resource that corresponds to the CSI, SubslotLength-ForPUCCH is configured as 7, which indicates that the number of symbols in a sub-slot is 7, a starting symbol index (startingSymbolIndex) of the PUCCH resource is configured as 2, and the number of symbols (nrofSymbols) is configured as 4, where the starting symbol index is an offset in a number of symbols with respect to the first symbol of a slot in which the PUCCH resource is located, then based on the foregoing configuration content, it can be determined that a slot in which the CSI is located is the second slot in the period (4 slots), a sub-slot in which the CSI is located is the first sub-slot of the second slot, and a resource location of the PUCCH resource that corresponds to the CSI in the first sub-slot is from the third symbol to the sixth symbol, as shown in FIG. 2A.

Figure 2B:
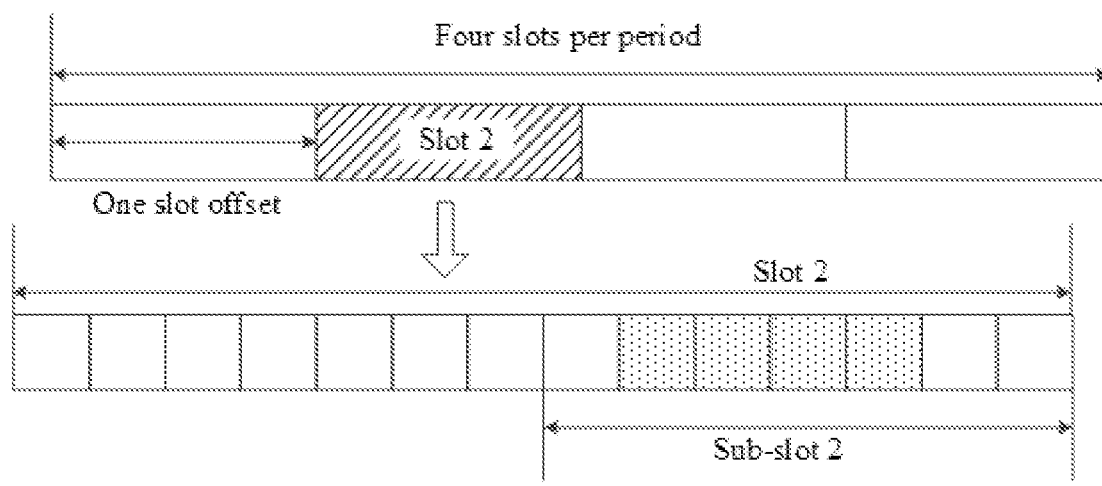
FIG. 2B is a second schematic diagram of a slot of a transmission location in example 1 of this disclosure.

If the starting symbol index of the PUCCH resource is configured as 8, the number of symbols is configured as 4, and other configuration remains unchanged, then based on the configuration content, it can be determined that the slot in which the CSI is located is the second slot of the period (4 slots), the sub-slot in which the CSI is located is the second sub-slot of the second slot, and a resource location of the PUCCH resource that corresponds to the CSI in the second sub-slot is from the third symbol to the sixth symbol, as shown in FIG. 2B.

Figure 2C:
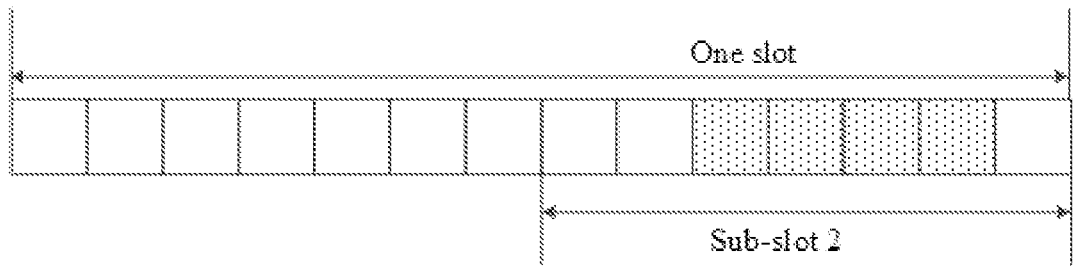
FIG. 2C is a third schematic diagram of a slot of a transmission location in example 1 of this disclosure.

Likewise, if PUCCH-Config corresponding to a PUCCH resource for HARQ-ACK configures SubslotLength-For-PUCCH as 7, the starting symbol index of the corresponding PUCCH resource as 2, and the number of symbols as 4, then the starting symbol index is an offset in a number of symbols with respect to the first symbol of a sub-slot in which the PUCCH resource is located (less than length of the sub-slot). Then based on physical downlink shared channel (PDSCH) to-HARQ-ACK_feedback timing indicator, PDSCH-to-HARQ_feedback timing indicator, or an RRC parameter dl-DataToUL-ACK, a sub-slot of the HARQ-ACK feedback can be determined, where the sub-slot may be the second sub-slot of a corresponding slot, and a resource location of the PUCCH resource in the sub-slot may be determined based on a starting symbol and the number of symbols of the PUCCH, as shown in FIG. 2C.

It should be noted that, under such configuration, in one implementation, a starting symbol index of a CSI PUCCH (or SR PUCCH) is with respect to a starting symbol of a corresponding slot, and the starting symbol index may be greater than or equal to the length of a sub-slot, but a base station should ensure that the CSI PUCCH (or SR PUCCH) is configured to be located in only one sub-slot. In another implementation, the starting symbol index of the CSI PUCCH (or SR PUCCH) corresponds to the starting symbol of the corresponding slot, the starting symbol index may be greater than or equal to the length of a sub-slot, and the base station may configure the CSI PUCCH (or SR PUCCH) to be located in different sub-slots, that is, to cross a sub-slot boundary. Alternatively, when the PUCCH resource does not collide with another channel (for example, HARQ-ACK PUCCH), the PUCCH may cross a sub-slot boundary, and otherwise, the PUCCH may not cross a sub-slot boundary.

Example 2

Example 2 takes CSI as an example, where a periodicity and offset configuration of the CSI (CSI-ReportPeriodicity-AndOffset) is {slots4, and INTEGER(0 . . . 3)=1}, indicating that the CSI has a periodicity of 4 slots and an offset of 1 slot.

Figure 3:
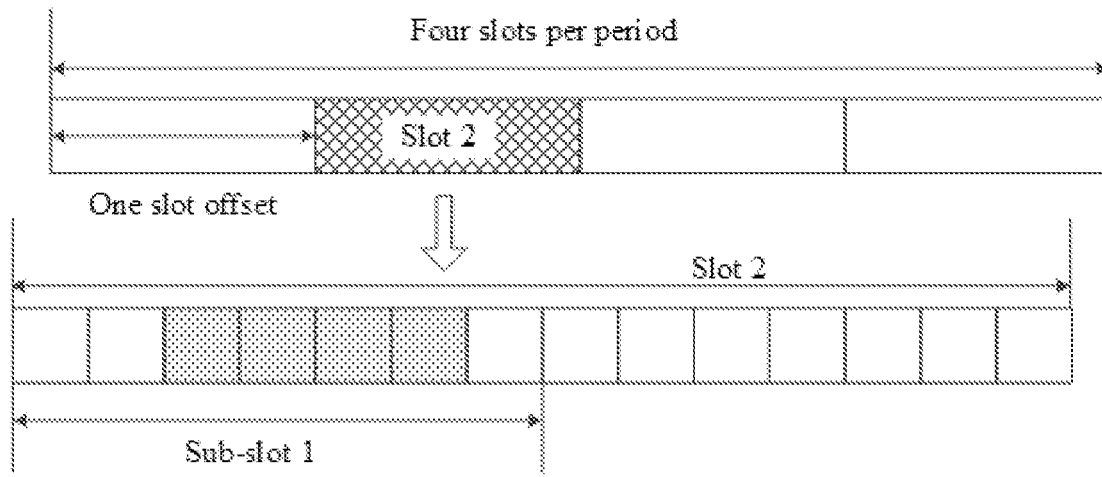
FIG. 3 is a schematic diagram of a slot of a transmission location in example 2 of this disclosure.

If in a PUCCH configuration (PUCCH-Config) corresponding to a PUCCH resource that corresponds to the CSI, SubslotLength-ForPUCCH is configured as 7, which means that the number of symbols in a sub-slot is 7, a starting symbol index (startingSymbolIndex) of the PUCCH resource is configured as 2, and the number of symbols (nrofSymbols) is configured as 4, where the starting symbol index is an offset in a number of symbols with respect to the first symbol of a sub-slot in which the PUCCH resource is located, and the starting symbol index must be less than a symbol length of the sub-slot (7), then based on the foregoing configuration content, it can be determined that a slot in which the CSI is located is the second slot in a period (4 slots), as shown in FIG. 3; as for determining of the sub-slot, it may be determined as pre-defined, for example, that the desired sub-slot is the first sub-slot of the slot, that a sub-slot in which the CSI is located is the first sub-slot of the second slot, as shown in FIG. 3.

Example 3

Example 3 takes CSI as an example, where a periodicity and offset configuration of the CSI (CSI-ReportPeriodicity-AndOffset) is {slots4, and INTEGER(0 . . . 3)=1}, indicating that the CSI has a periodicity of 4 slots and an offset of 1 slot.

Figure 4:
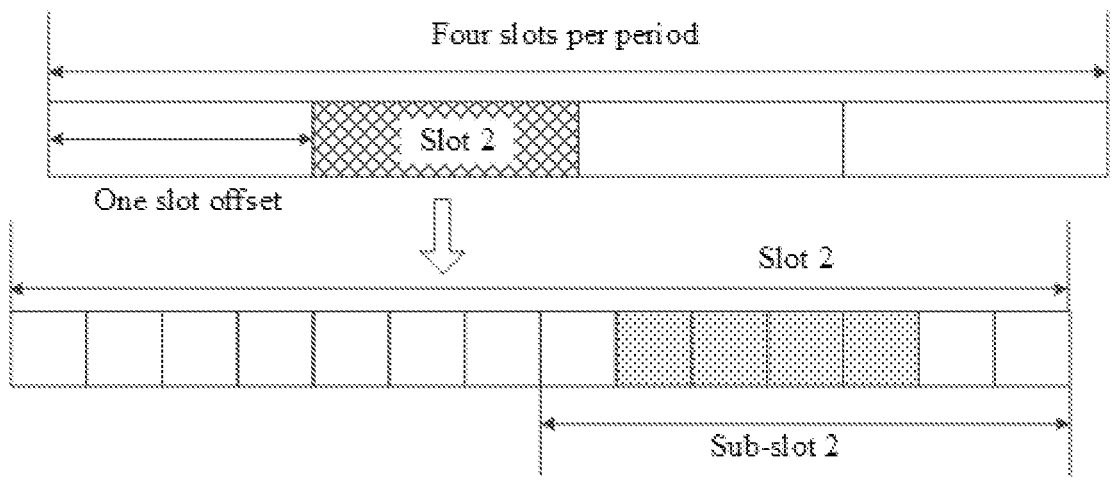
FIG. 4 is a schematic diagram of a slot of a transmission location in example 3 of this disclosure.

In a PUCCH configuration (PUCCH-Config) corresponding to a PUCCH resource that corresponds to the CSI, SubslotLength-ForPUCCH is configured as 7, meaning the number of symbols in a sub-slot is 7, a starting symbol index (startingSymbolIndex) of the PUCCH resource is configured as 1, and the number of symbols (nrofSymbols) is configured as 4, where the starting symbol index is an offset in a number of symbols with respect to the first symbol of a sub-slot in which the PUCCH resource is located, and the starting symbol index must be less than a symbol length of the sub-slot (7). In addition, a sub-slot offset in the slot is configured by RRC, for example, RRC configuration information includes CSI-ReportSub-slotOffset INTERGER (0 . . . N−1), where N denotes the number of sub-slots in one slot. For example, N=2, and CSI-ReportSub-slotOffset=1, which indicates the second sub-slot of the slot. Then based on the foregoing configuration content, it can be determined that the slot in which the CSI is located is the second slot in a period (4 slots), the sub-slot in which the CSI is located is the second sub-slot of the second slot, and a resource location of the PUCCH resource that corresponds to the CSI in the second sub-slot is from the second symbol to the fifth symbol, as shown in FIG. 4.

It should be noted that, the foregoing example 1 to example 3 are described by using CSI as an example. However, if the CSI is replaced with a SR (a periodicity of the SR is longer than or equal to one slot), the foregoing resource determining procedure is also applicable. Details are not described herein again.

Example 4

Figure 5:
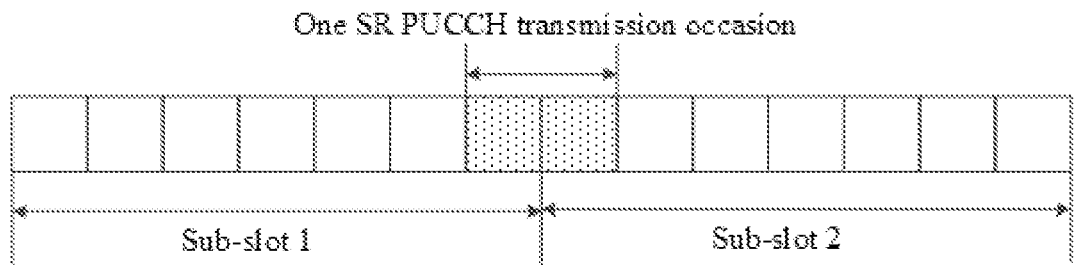
FIG. 5 is a schematic diagram of a slot of a transmission location in example 4 of this disclosure.

Example 4 takes a SR as an example, where a periodicity of the SR is shorter than 1 slot, for example, the periodicity is 2 symbols or 7 symbols. If a periodicity and offset configuration of the SR is based on slots, and a starting symbol index of a PUCCH resource corresponding to the SR is an offset in a number of symbols with respect to the first symbol of a slot in which the PUCCH resource is located, then a starting symbol location l of a PUCCH transmission occasion resource for the SR may be determined by using a formula $(l_0 \text{ mod } N) \text{ mod } SR_{PERIODICITY}=0$ in related technology, where $l_0$ denotes the starting symbol index, and $SR_{PERIODICITY}$ denotes the number of symbols in the periodicity of the SR. In this case, for a plurality of SR PUCCH transmission occasion resources determined in a slot, none of the SR PUCCH transmission occasion resources may cross a sub-slot boundary. If a PUCCH transmission occasion resource is across a sub-slot boundary (as shown in FIG. 5), that resource is unusable.

Figure 6:
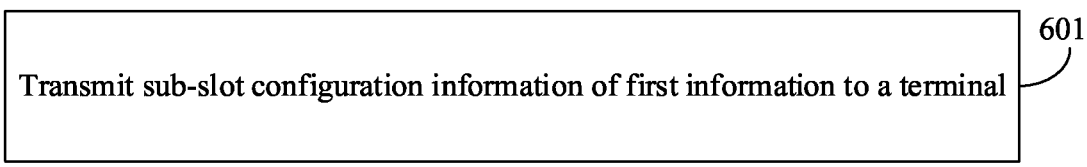
FIG. 6 is a flowchart of a resource configuration method according to an embodiment of this disclosure.

Referring to FIG. 6, FIG. 6 is a flowchart of a resource configuration method according to an embodiment of this disclosure. The method is applied to a network device, and as shown in FIG. 6, the method includes the following steps.

Step 601: Transmit sub-slot configuration information of first information to a terminal.

The sub-slot configuration information indicates an offset of a sub-slot in which the first information is located in a slot in which the first information is located.

Alternatively, in a case that a periodicity of the first information is longer than a symbol length of the sub-slot in which the first information is located and shorter than one slot, the sub-slot configuration information indicates an offset of the sub-slot in which the first information is located in the periodicity of the first information.

Optionally, the sub-slot configuration information is transmitted by using a new RRC parameter.

In an implementation, the new RRC parameter may be CSI-ReportSub-slotOffset INTERGER(0 . . . N−1) or SR-ReportSub-slotOffset INTERGER(0 . . . N−1), where N denotes the number of sub-slots in one slot. For example, if N=2 and CSI-ReportSub-slotOffset=1, the second sub-slot of the slot is indicated.

Optionally, the offset is measured in sub-slots, or the offset is measured in symbols.

Optionally, the first information includes one of the following: a SR and CSI.

In this way, with the sub-slot configuration information transmitted to the terminal, the terminal can determine transmission information such as a sub-slot in which the SR or CSI is located.

The foregoing embodiments describe the resource determining method and the resource configuration method in this disclosure. The following describes the terminal and network device in this disclosure with reference to the embodiments and the accompanying drawings.

Figure 7:
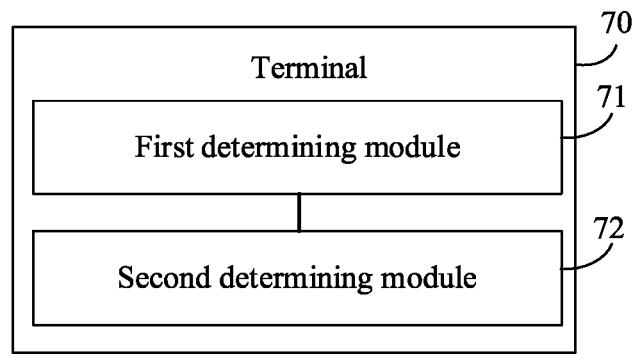
FIG. 7 is a first schematic structural diagram of a terminal according to an embodiment of this disclosure.

Referring to FIG. 7, FIG. 7 is a schematic structural diagram of a terminal according to an embodiment of this disclosure. As shown in FIG. 7, the terminal 70 includes:
a first determining module 71, configured to determine a sub-slot in which first information is located; and
a second determining module 72, configured to determine, based on starting symbol information and the number of symbols of a PUCCH resource corresponding to the first information, a resource location of the PUCCH resource in the sub-slot.

Optionally, the first determining module 71 includes:
a first determining unit, configured to determine, based on configuration information of the first information, a slot in which the first information is located, where the configuration information indicates a periodicity and an offset of the first information, the periodicity measured in slots and the offset measured in slots; and
a second determining unit, configured to determine the sub-slot in which the first information is located based on any one of the following:
a pre-defined relationship between the sub-slot and the slot;
the starting symbol information of the PUCCH resource; and
a preconfigured offset of the sub-slot in the slot.

Optionally, the pre-defined relationship between the sub-slot and the slot includes one of the following:
the sub-slot is the first sub-slot of the slot; and
the sub-slot is the last sub-slot of the slot.

Optionally, the starting symbol information of the PUCCH resource includes: a starting symbol index of the PUCCH resource.

Optionally, the starting symbol index of the PUCCH resource is an offset, in a number of symbols, of a starting symbol of the PUCCH resource with respect to the first symbol of a slot in which the PUCCH resource is located; or
the starting symbol index of the PUCCH resource is an offset, in a number of symbols, of the starting symbol of the PUCCH resource with respect to the first symbol of a sub-slot in which the PUCCH resource is located.

Optionally, the first information includes one of the following:
a scheduling request SR and channel state information CSI, where
in a case that the first information is a SR, a periodicity of the SR is longer than one slot.

Further, when the first information also includes HARQ-ACK feedback information, a starting symbol of the PUCCH resource corresponding to the HARQ-ACK feedback information is defined with respect to the first symbol of a sub-slot in which the PUCCH resource is located.

Optionally, in a case that the first information is a SR and a periodicity of the SR is one slot, the first determining module 71 is specifically configured to:
determine a sub-slot in which the SR is located in each slot based on any one of the following:
a pre-defined relationship between the sub-slot and each slot;
the starting symbol information of the PUCCH resource; and
a preconfigured offset of the sub-slot in each slot.

Optionally, in a case that the first information is a SR and a periodicity of the SR is shorter than one slot, the first determining module 71 is specifically configured to:
determine a sub-slot in which the SR is located in each slot based on any one of the following:
the starting symbol information of the PUCCH resource; and
in a case that the periodicity of the SR is longer than a symbol length of the sub-slot, a preconfigured offset of the sub-slot in the periodicity of the SR.

The terminal 70 in this embodiment of this disclosure can implement the processes of the method embodiment in FIG. 1, with the same beneficial effects achieved. To avoid repetition, details are not described herein again.

Figure 8:
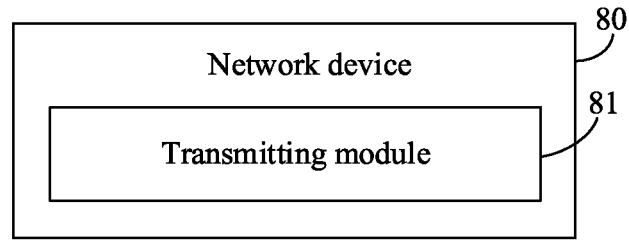
FIG. 8 is a first schematic structural diagram of a network device according to an embodiment of this disclosure.

Referring to FIG. 7, FIG. 7 is a schematic structural diagram of a network device according to an embodiment of this disclosure. As shown in FIG. 8, the network device 80 includes:
a transmitting module 81, configured to transmit sub-slot configuration information of first information to a terminal, where
the sub-slot configuration information indicates an offset of a sub-slot in which the first information is located in a slot in which the first information is located; or
in a case that a periodicity of the first information is longer than a symbol length of the sub-slot in which the first information is located and shorter than one slot, the sub-slot configuration information indicates an offset of the sub-slot in which the first information is located in the periodicity of the first information.

Optionally, the sub-slot configuration information is transmitted by using a new RRC parameter.

In an implementation, the new RRC parameter may be CSI-ReportSub-slotOffset INTERGER(0 . . . N−1) or SR-ReportSub-slotOffset INTERGER(0 . . . N−1), where N denotes the number of sub-slots in one slot. For example, if N=2 and CSI-ReportSub-slotOffset=1, the second sub-slot of the slot is indicated.

Optionally, the offset is measured in sub-slots, or the offset is measured in symbols.

Optionally, the first information includes one of the following: a SR and CSI.

In this way, with the sub-slot configuration information transmitted to the terminal, the terminal can determine transmission information such as a sub-slot in which the SR or CSI is located.

An embodiment of this disclosure further provides a communications device, including a processor, a memory, and a computer program stored in the memory and capable of running on the processor. When the computer program is executed by the processor, the processes of the embodiments of the foregoing method shown in FIG. 1 are implemented, or the processes of the embodiments of the foregoing method shown in FIG. 6 are implemented, with the same technical effects achieved. To avoid repetition, details are not described herein again. The communications device is optionally a terminal or a network device.

Figure 9:
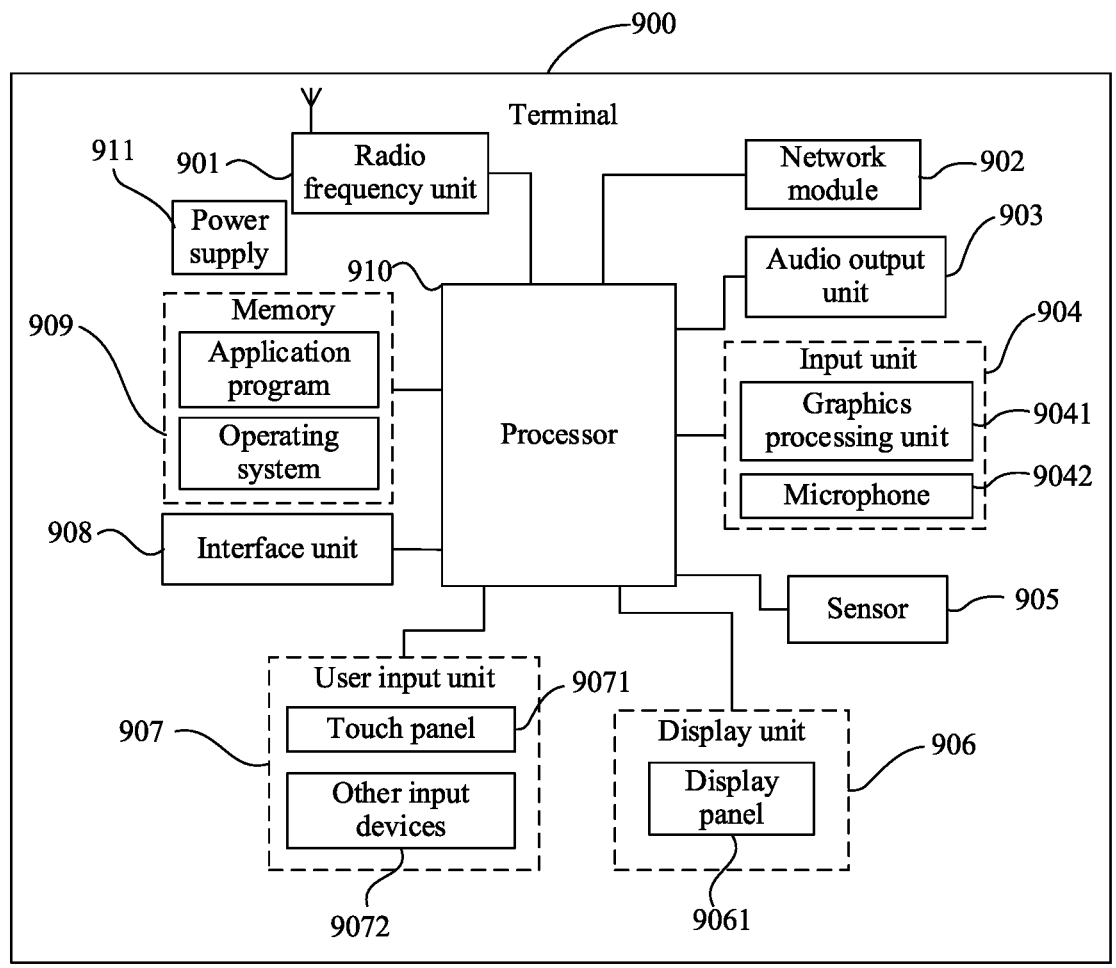
FIG. 9 is a second schematic structural diagram of a terminal according to an embodiment of this disclosure.

Referring to FIG. 9, FIG. 9 is a schematic diagram of a hardware structure of a terminal for implementing the embodiments of this disclosure. The terminal 900 includes but is not limited to components such as a radio frequency unit 901, a network module 902, an audio output unit 903, an input unit 904, a sensor 905, a display unit 906, a user input unit 907, an interface unit 908, a memory 909, a processor 910, and a power supply 911. A person skilled in the art may understand that the structure of the terminal shown in FIG. 9 does not constitute any limitation on the terminal. The terminal may include more or fewer components than those shown in the figure, or combine some of the components, or arrange the components differently. In this embodiment of this disclosure, the terminal includes but is not limited to a mobile phone, a tablet computer, a notebook computer, a palmtop computer, an in-vehicle terminal, a wearable device, a pedometer, or the like.

The processor 910 is configured to determine, a sub-slot in which first information is located; and based on starting symbol information and the number of symbols of a PUCCH resource corresponding to the first information, a resource location of the PUCCH resource in the sub-slot. The first information may be SR or CSI.

The terminal 900 in this embodiment of this disclosure can implement the processes of the method embodiment in FIG. 1, with the same beneficial effects achieved. To avoid repetition, details are not described herein again.

It should be understood that, in this embodiment of this disclosure, the radio frequency unit 901 may be configured to transmit or receive a signal in an information transmitting/receiving or call process. Specifically, the radio frequency unit 901 receives downlink data from a base station and transmits the downlink data to the processor 910 for processing; and transmits uplink data to the base station. Generally, the radio frequency unit 901 includes but is not limited to an antenna, at least one amplifier, a transceiver, a coupler, a low noise amplifier, a duplexer, and the like. In addition, the radio frequency unit 901 may also communicate with a network and other devices via a wireless communications system.

The terminal provides a user with wireless broadband Internet access by using the network module 902, for example, helping the user to transmit and receive e-mails, browse web pages, and access streaming media.

The audio output unit 903 may convert audio data into an audio signal, and output the audio signal as sound, where the audio data is received by the radio frequency unit 901 or the network module 902, or stored in the memory 909. In addition, the audio output unit 903 may further provide audio output (for example, a call signal received tone or a message received tone) that is related to a specific function performed by the terminal 900. The audio output unit 903 includes a speaker, a buzzer, a receiver, and the like.

The input unit 904 is configured to receive an audio or video signal. The input unit 904 may include a graphics processing unit (GPU) 9041 and a microphone 9042. The graphics processing unit 9041 processes image data of a static picture or a video that is obtained by an image capture apparatus (for example, a camera) in a video capture mode or an image capture mode. A processed image frame may be displayed on the display unit 906. The image frame processed by the graphics processing unit 9041 may be stored in the memory 909 (or another storage medium) or transmitted by using the radio frequency unit 901 or the network module 902. The microphone 9042 is capable of receiving sounds and processing such sounds into audio data. The processed audio data may be converted in a telephone call mode into a format that can be transmitted by the radio frequency unit 901 to a mobile communications base station, for outputting.

The terminal 900 further includes at least one sensor 905, for example, an optical sensor, a motion sensor, and other sensors. Specifically, the optical sensor may include an ambient light sensor and a proximity sensor. The ambient light sensor may adjust luminance of the display panel 9061 based on brightness of ambient light, and the proximity sensor may turn off a display panel 9061 and/or backlight when the terminal 900 moves close to an ear. As a type of motion sensor, an accelerometer sensor can detect magnitudes of accelerations in all directions (usually three axes), can detect a magnitude and a direction of gravity when being static, and can be applied to terminal posture recognition (such as screen switching between portrait and landscape, related games, and magnetometer posture calibration), functions related to vibration recognition (such as pedometer and tapping), and the like. The sensor 905 may also include a fingerprint sensor, a pressure sensor, an iris sensor, a molecular sensor, a gyroscope, a barometer, a hygrometer, a thermometer, an infrared sensor, and the like. Details are not described herein.

The display unit 906 is configured to display information input by the user or information provided for the user. The display unit 906 may include the display panel 9061. The display panel 9061 may be configured in a form of a liquid crystal display (LCD), an organic light-emitting diode (OLED), or the like.

The user input unit 907 may be configured to receive input digit or character information, and generate key signal input that is related to user setting and function control of the terminal. Specifically, the user input unit 907 includes a touch panel 9071 and other input devices 9072. The touch panel 9071 is also referred to as a touchscreen, and may collect a touch operation of the user on or near the touch panel (for example, an operation performed on or near the touch panel 9071 by the user by using any appropriate object or accessory such as a finger or a stylus). The touch panel 9071 may include two parts: a touch detection apparatus and a touch controller. The touch detection apparatus detects a touch direction of a user, detects a signal brought by a touch operation, and transmits the signal to the touch controller. The touch controller receives touch information from the touch detection apparatus, converts the touch information into touchpoint coordinates, transmits the touchpoint coordinates to the processor 910, and receives and executes a command transmitted by the processor 910. In addition, the touch panel 9071 may be implemented in a plurality of forms, for example, as a resistive, capacitive, infrared, or surface acoustic wave touch panel. In addition to the touch panel 9071, the user input unit 907 may further include other input devices 9072. Specifically, the other input devices 9072 may include but are not limited to a physical keyboard, a function key (for example, a volume control key or a power on/off key), a trackball, a mouse, and a joystick. Details are not described herein.

Further, the touch panel 9071 may cover the display panel 9061. When detecting a touch operation on or near the touch panel 9071, the touch panel 9071 transmits the touch operation to the processor 910 for determining a type of the touch event. Then, the processor 910 provides a corresponding visual output on the display panel 9061 based on the type of the touch event. Although in FIG. 9, the touch panel 9071 and the display panel 9061 act as two separate parts to implement input and output functions of the terminal, in some embodiments, the touch panel 9071 and the display panel 9061 may be integrated to implement the input and output functions of the terminal. This is not specifically limited herein.

The interface unit 908 is an interface for connecting an external apparatus to the terminal 900. For example, the external apparatus may include a wired or wireless headphone port, an external power supply (or battery charger) port, a wired or wireless data port, a memory card port, a port for connecting an apparatus provided with an identification module, an audio input/output (I/O) port, a video I/O port, or an earphone port. The interface unit 908 may be configured to receive input (for example, data information and electric power) from the external apparatus, and transmit the received input to one or more elements in the terminal 900; or may be configured to transmit data between the terminal 900 and the external apparatus.

The memory 909 may be configured to store software programs and various data. The memory 909 may mainly include a program storage area and a data storage area. The program storage area may store an operating system, an application program required by at least one function (for example, an audio playing function and an image playing function), and the like. The data storage area may store data (for example, audio data and an address book) created according to use of the mobile phone. In addition, the memory 909 may include a high-speed random access memory, and may further include a nonvolatile memory, for example, at least one disk storage device, a flash memory device, or another volatile solid-state storage device.

The processor 910 is a control center of the terminal, which is connected to all components of the terminal by using various interfaces and lines. By running or executing software programs and/or modules stored in the memory 909 and invoking data stored in the memory 909, the processor 910 executes various functions of the terminal and processes data, so as to perform overall monitoring on the terminal. The processor 910 may include one or more processing units. Optionally, the processor 910 may integrate an application processor and a modem processor. The application processor mainly processes an operating system, a user interface, an application program, and the like. The modem processor mainly processes wireless communication. It can be understood that the modem processor may alternatively not be integrated in the processor 910.

The terminal 900 may further include a power supply 911 (for example, a battery) that supplies power to the components. Optionally, the power supply 911 may be logically connected to the processor 910 through a power management system, so as to implement functions such as charging management, discharging management, and power consumption management through the power management system.

In addition, the terminal 900 may further include some functional modules that are not shown. Details are not described herein.

Figure 10:
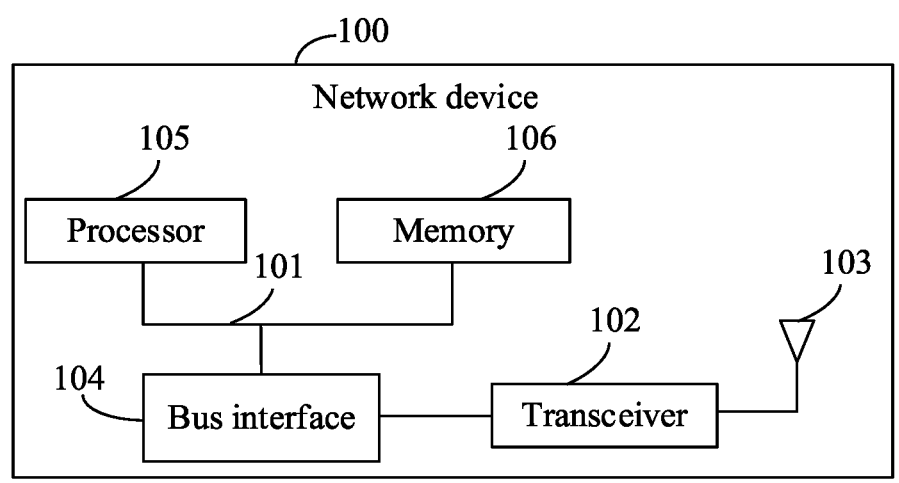
FIG. 10 is a second schematic structural diagram of a network device according to an embodiment of this disclosure.

Referring to FIG. 10, FIG. 10 is a schematic diagram of a hardware structure of a network device for implementing the embodiments of this disclosure. The network device 100 includes but is not limited to a bus 101, a transceiver 102, an antenna 103, a bus interface 104, a processor 105, and a memory 106.

In this embodiment of this disclosure, the network device 100 further includes a computer program stored in the memory 106 and capable of running on the processor 105, where when the computer program is executed by the processor 105, the following step is implemented:

transmit sub-slot configuration information of first information to a terminal, where the sub-slot configuration information indicates an offset of a sub-slot in which the first information is located in a slot in which the first information is located; or in a case that a periodicity of the first information is longer than a symbol length of the sub-slot in which the first information is located and shorter than one slot, the sub-slot configuration information indicates an offset of the sub-slot in which the first information is located in the periodicity of the first information.

Optionally, the first information includes one of the following: a SR and CSI.

The transceiver 102 is configured to transmit and receive data under control of the processor 105.

The network device 100 in this embodiment of this disclosure can implement the processes of the method embodiment in FIG. 6, with the same beneficial effects achieved. To avoid repetition, details are not described herein again.

In FIG. 10, in a bus architecture (represented by the bus 101), the bus 101 may include any quantity of interconnected buses and bridges, and the bus 101 connects various circuits that include one or more processors represented by the processor 105 and a memory represented by the memory 106. The bus 101 may further connect various other circuits, such as a peripheral device, a voltage regulator, and a power management circuit. These are common sense in the art, and therefore are not further described in this specification. The bus interface 104 provides an interface between the bus 101 and the transceiver 102. The transceiver 102 may be one element, or may be a plurality of elements, for example, a plurality of receivers and transmitters, and provides a unit for communicating with various other apparatuses on a transmission medium. Data processed by the processor 105 is transmitted on a wireless medium through the antenna 103. Further, the antenna 103 receives data and transmits the data to the processor 105.

The processor 105 is responsible for managing the bus 101 and general processing, and may further provide various functions, including timing, a peripheral interface, voltage regulation, power management, and other control functions. The memory 106 may be configured to store data for use by the processor 105 when the processor 105 performs an operation.

Optionally, the processor 105 may be a central processing unit (CPU), an application-specific integrated circuit (ASIC), a field-programmable gate array (FPGA), or a complex programmable logic device (CPLD).

An embodiment of this disclosure further provides a computer-readable storage medium, where the computer-readable storage medium stores a computer program, and when the computer program is executed by a processor, the processes of the embodiments of the method shown in FIG. 1 are implemented, or the processes of the embodiments of the method shown in FIG. 6 are implemented, and the same technical effects can be achieved. Therefore, details are not described herein again to avoid repetition. The computer-readable storage medium may be a read-only memory (ROM), a random access memory (RAM), a magnetic disk, an optical disc, or the like.

It should be noted that, in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. Without more constraints, an element preceded by "includes a . . . " does not preclude the presence of other identical elements in the process, method, article, or apparatus that includes the element.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be indirect couplings or communication connections through some interfaces, apparatuses or units, and may be implemented in electrical, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

According to the description of the foregoing implementations, persons skilled in the art can clearly understand that the method in the foregoing embodiments may be implemented by software in addition to a necessary universal hardware platform or by hardware only. In many cases, the former is a preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

It may be understood that the embodiments described in the embodiments of this disclosure may be implemented by hardware, software, firmware, middleware, microcode, or a combination thereof. In implementation by hardware, modules, units, and subunits may be implemented in one or more application-specific integrated circuits (ASIC), digital signal processors (DSP), digital signal processing devices (DSP Device, DSPD), programmable logic devices (PLD), field-programmable gate arrays (FPGA), general-purpose processors, controllers, microcontrollers, microprocessors, other electronic units used to implement the functions described in this disclosure, or a combination thereof.

For software implementation, the technologies described in the embodiments of this disclosure may be implemented by modules (for example, processes or functions) that perform the functions described in the embodiments of this disclosure. Software code may be stored in the memory and executed by the processor. The memory may be implemented in the processor or external to the processor.

The foregoing describes the embodiments of this disclosure with reference to the accompanying drawings. However, this disclosure is not limited to the foregoing specific implementations. The foregoing specific implementations are merely illustrative rather than restrictive. In light of this disclosure, a person of ordinary skill in the art may develop many other forms without departing from the principle of this disclosure and the protection scope of the claims, and all such forms shall fall within the protection scope of this disclosure.

What is claimed is:

1. A resource determining method, applied to a terminal and comprising:
   determining a sub-slot in which first information is located; and
   determining, based on starting symbol information and the number of symbols of a physical uplink control channel (PUCCH) resource corresponding to the first information, a resource location of the PUCCH resource in the sub-slot;
   wherein the determining the sub-slot in which first information is located comprises:
   determining, based on configuration information of the first information, a slot in which the first information is located, wherein the configuration information indicates a periodicity and an offset of the first information, the periodicity measured in slots and the offset measured in slots; and
   determining, based on the starting symbol information of the PUCCH resource, the sub-slot in which the first information is located.

2. The method according to claim 1, wherein the starting symbol information of the PUCCH resource comprises: a starting symbol index of the PUCCH resource.

3. The method according to claim 2, wherein
   the starting symbol index of the PUCCH resource is an offset, in a number of symbols, of a starting symbol of the PUCCH resource with respect to the first symbol of a slot in which the PUCCH resource is located.

4. The method according to claim 2, wherein the determining, based on the starting symbol information of the PUCCH resource, the sub-slot in which the first information is located comprises: determining, based on the starting symbol index and the number of symbols in the sub-slot, the sub-slot in which the first information is located.

5. The method according to claim 1, wherein the first information comprises any one of the following:
   a scheduling request (SR) and channel state information (CSI), wherein
   in a case that the first information is a SR, a periodicity of the SR is longer than one slot.

6. The method according to claim 5, wherein when the first information further comprises hybrid automatic repeat request acknowledgement (HARQ-ACK) feedback information,
   a starting symbol index of a PUCCH resource corresponding to the HARQ-ACK feedback information is an offset, in a number of symbols, of the starting symbol of the PUCCH resource with respect to the first symbol of the sub-slot in which the PUCCH resource is located.

7. The method according to claim 1, wherein the PUCCH resource corresponding to the first information is located in only one sub-slot.

8. A non-transitory computer-readable storage medium, storing a computer program, wherein when the computer program is executed by a processor, the steps of the resource determining method according to claim 1 are implemented.

9. A communications device, comprising a memory, a processor, and a computer program stored in the memory and capable of running on the processor, wherein when the computer program is executed by the processor, following steps are implemented:
   determining a sub-slot in which first information is located; and
   determining, based on starting symbol information and the number of symbols of a physical uplink control channel (PUCCH) resource corresponding to the first information, a resource location of the PUCCH resource in the sub-slot;
   wherein the determining the sub-slot in which first information is located comprises:
   determining, based on configuration information of the first information, a slot in which the first information is located, wherein the configuration information indicates a periodicity and an offset of the first information, the periodicity measured in slots and the offset measured in slots; and
   determining, based on the starting symbol information of the PUCCH resource, the sub-slot in which the first information is located.

10. The communications device according to claim 9, wherein the starting symbol information of the PUCCH resource comprises: a starting symbol index of the PUCCH resource.

11. The communications device according to claim 10, wherein
   the starting symbol index of the PUCCH resource is an offset, in a number of symbols, of a starting symbol of the PUCCH resource with respect to the first symbol of a slot in which the PUCCH resource is located.

12. The communications device according to claim 10, wherein the determining, based on the starting symbol information of the PUCCH resource, the sub-slot in which the first information is located comprises: determining, based on the starting symbol index and the number of symbols in the sub-slot, the sub-slot in which the first information is located.

13. The communications device according to claim 9, wherein the first information comprises any one of the following:
   a scheduling request (SR) and channel state information (CSI), wherein
   in a case that the first information is a SR, a periodicity of the SR is longer than one slot.

14. The communications device according to claim 13, wherein when the first information further comprises hybrid automatic repeat request acknowledgement (HARQ-ACK) feedback information,
   a starting symbol index of a PUCCH resource corresponding to the HARQ-ACK feedback information is an offset, in a number of symbols, of the starting symbol of the PUCCH resource with respect to the first symbol of the sub-slot in which the PUCCH resource is located.

15. The communications device according to claim 9, wherein the PUCCH resource corresponding to the first information is located in only one sub-slot.

16. A communications device, comprising a memory, a processor, and a computer program stored in the memory and capable of running on the processor, wherein when the computer program is executed by the processor, a resource configuration method is implemented, and the method comprises:
   transmitting configuration information of first information and sub-slot configuration information thereof to a terminal, wherein the configuration information of the first information indicates a periodicity and an offset of the first information, the periodicity measured in slots and the offset measured in slots, and the sub-slot configuration information indicates the number of symbols in a sub-slot, wherein
   a PUCCH resource corresponding to the first information is located in only one sub-slot;
   the configuration information of the first information is used by the terminal to determine a slot in which the first information is located, and to determine, based on starting symbol information and the number of symbols of a PUCCH resource corresponding to the first information and the sub-slot configuration information, a resource location of the PUCCH resource in the sub-slot in which the first information is located.

17. The communications device according to claim 16, wherein the number of symbols in a sub-slot is 2 or 7.

18. The communications device according to claim 16, wherein the sub-slot configuration information is transmitted by using a radio resource control (RRC) parameter.

19. The communications device according to claim 16, wherein the first information comprises any one of the following: a scheduling request (SR) and channel state information (CSI).

* * * * *